No. 633,602. Patented Sept. 26, 1899.
H. MEYER.
TIRE TIGHTENER.
(Application filed Dec. 16, 1898.)
(No Model.)

Witnesses:
R. G. Orwig.
S. C. Sweet.

Inventor: Henry Meyer,
By Thomas G. Orwig, Attorney.

UNITED STATES PATENT OFFICE.

HENRY MEYER, OF EXIRA, IOWA.

TIRE-TIGHTENER.

SPECIFICATION forming part of Letters Patent No. 633,602, dated September 26, 1899.

Application filed December 16, 1898. Serial No. 699,517. (No model.)

*To all whom it may concern:*

Be it known that I, HENRY MEYER, a citizen of the United States, residing at Exira, in the county of Audubon and State of Iowa, have invented a new and useful Tire-Tightener, of which the following is a specification.

The object of this invention is to provide improved means for tightening tires upon wheel-rims by expanding the wheel-rims within the tires.

This invention consists in the construction, arrangement, and combination of elements hereinafter set forth, pointed out in my claims, and illustrated by the accompanying drawings, in which—

Figure 1:
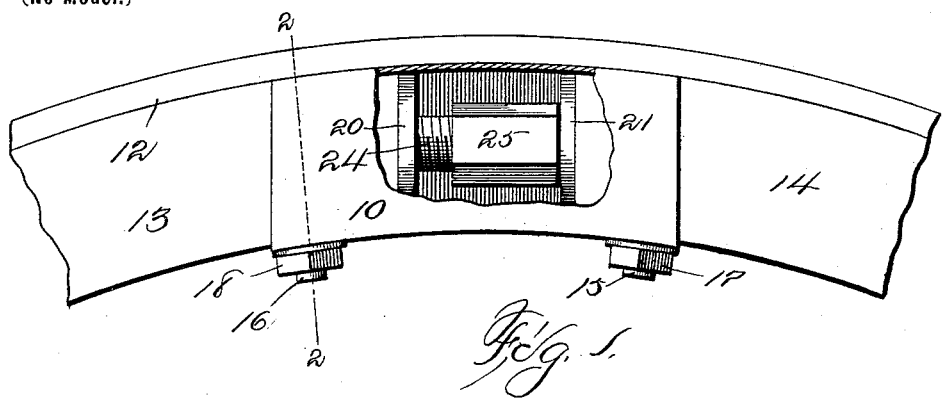
Figure 2:
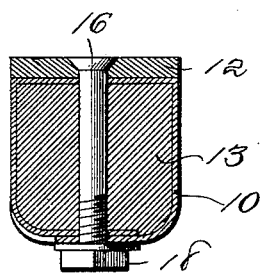
Figure 3:
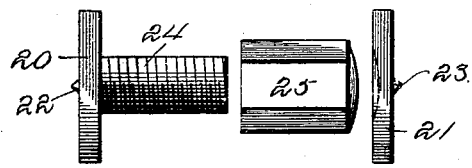
Figure 4:
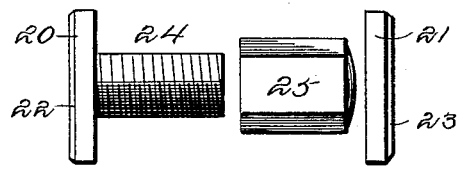

Figure 1 is an elevation of a portion of a wheel-rim and tire thereon, showing my device mounted in position for practical use and broken away on one side to illustrate the interior construction thereof. Fig. 2 is a cross-section on the indicated line 2 2 of Fig. 1. Fig. 3 is a side elevation, and Fig. 4 is a plan, of detail elements entering into the structure of my device.

In the construction and application of the device as shown the numeral 10 designates an elongated open-ended tube or casing made of a single piece of sheet metal approximately elliptical in cross-section and the outer apex of the ellipse flattened and broadened to provide a seat or engaging portion 11 for contact with the inner surface of a wheel-tire 12. The edges of the section of sheet metal employed in constructing the casing or tube 10 are overlapped at the remaining apex of the ellipse thereof. Coinciding bolt-holes in the top and bottom of each end portion of the tube admit bolts, as required, to fasten the tube to the tire on the wheel and to allow the adjustment of the rim within the tube. Thus a tube is produced in such a manner as to be adapted in size and shape so that it can be opened at its inner side to admit expanding devices and when closed as to receive the meeting end portions of fellies 13 14 of a wheel-rim, and the fellies, casing or tube, and the wheel-tire are connected by tire-bolts 15 16, seated in and transversely of apertures in the tire and tube and in slots in the fellies and retained by means of nuts 17 18, mounted on the inner ends of the tire-bolts and impinging the lower or axial surface of the casing. The meeting ends of the fellies 13 14 enter the open ends of the casing 10, and wearing-blocks 20 21 are mounted within the casing and in contact with the ends of said fellies. The wearing-blocks 20 21 are provided with ribs, lugs, or projections 22 23 on their faces engaging in and contacting rigidly with the ends of the fellies, whereby the wearing-blocks are retained against torsional movement relative to the fellies. A screw-threaded stud 24 is formed on or fixed to the wearing-block 20 and projects toward the wearing-block 21. A polygonal nut 25 is screw-seated upon and arranged for travel relative to the screw-threaded stud 24, and one end of said nut is rounded or convexed and seated in a concaved seat in the face of the wearing-block 21 opposite to the web, rib, projection, or stud 23.

In practical operation the wearing-blocks are mounted between the meeting ends of fellies and separated by the stud 24 and nut 25. The nut 25 is then unscrewed relative to the stud 24 to such an extent as to expand the wheel-rim by the separation of the fellies into close contact with the inner face of the wheel-tire. The edges of the casing 10 are then overlapped and the tire-bolts 15 16 positioned, as shown in Fig. 1 of the drawings, traversing apertures in the overlapping edges of the casing and retaining the same closed and practically impervious to mud and other substances, whereby the operation of the nut and its usefulness might be impaired. When the wheel-rim becomes loose within the tire, the tire-bolts 15 16 are removed, the casing opened by separation of the overlapping edges thereof, and the nut 25 further unscrewed from the stud 24 to an extent sufficient to tighten the tire.

I claim as my invention—

1. A tubular casing made of a single piece of sheet metal adapted to overlie the inner surface of a wheel-tire and its inner edges overlapping and adapted to be separated to admit expanding devices and its open ends adapted to admit the ends of fellies and provided with coinciding bolt-holes in its end portions as and for the purposes stated.

2. In a tire-tightener, an open-ended tube made of sheet metal having separable overlying parts along its length to engage the inner surface of a rim and coinciding bolt-holes in its end portions, metal blocks passed into the tube between the separable overlying edges of the tube and a screw and nut placed between said block as shown and described to operate in the manner set forth for the purposes stated.

3. A tire-tightener comprising an open-ended sheet-metal tube adapted to inclose the ends of a rim and to be opened at the inner face of the rim to admit expanding devices to be placed between the ends of the rim and within the tube, coinciding bolt-holes in the end portions of the tube, and bolts to extend through the wheel-tire, the ends of the rim and the tube, arranged and combined with a rim and a tire in the manner set forth for the purposes stated.

HENRY MEYER.

Witnesses:
MOSES NEUMANN,
THOMAS G. ORWIG.